Aug. 7, 1945.  W. P. HUNSDORF  2,381,750
COIL WINDING APPARATUS
Filed Sept. 7, 1943  5 Sheets-Sheet 1
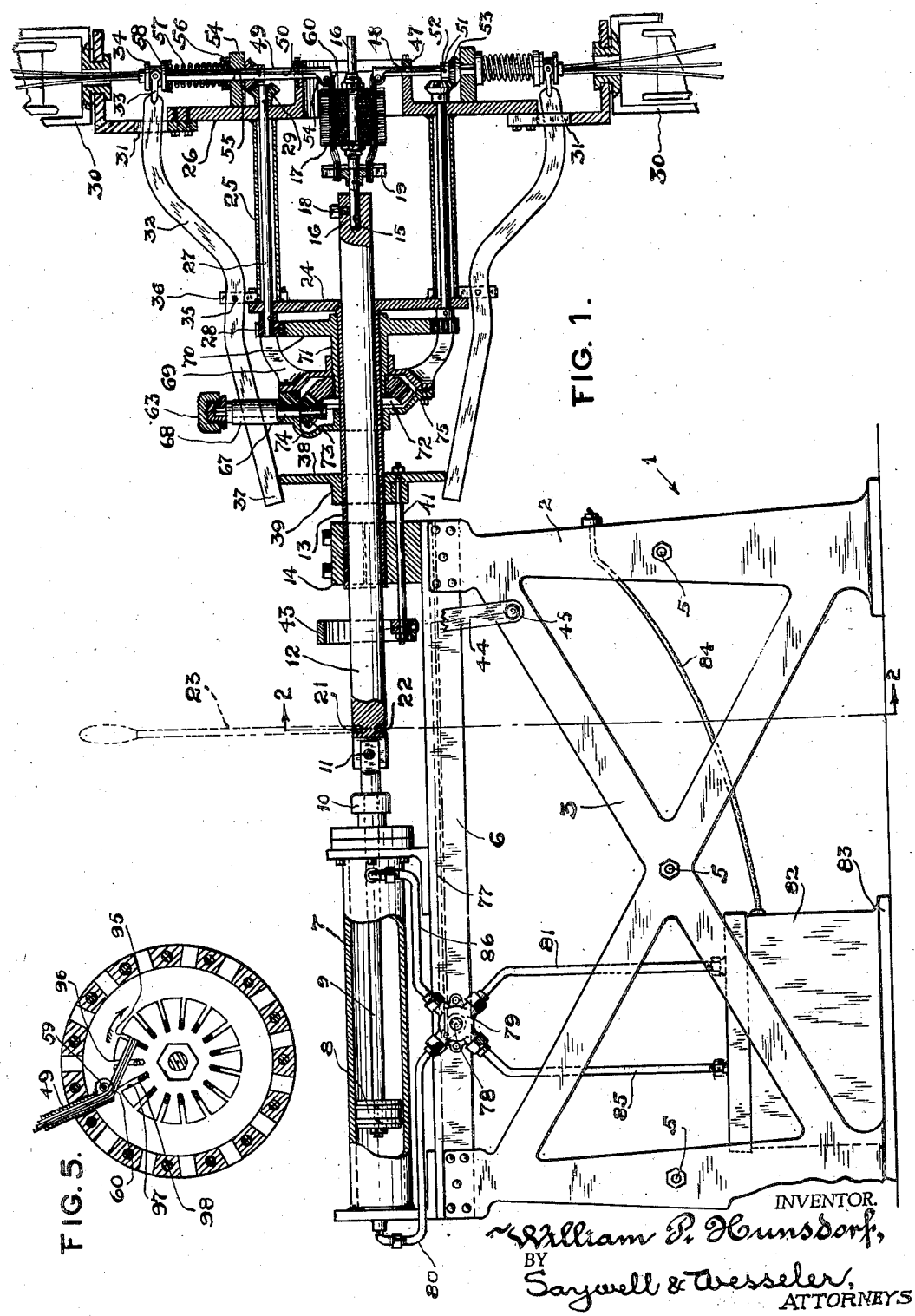
INVENTOR.
William P. Hunsdorf,
BY Saywell & Wesseler,
ATTORNEYS Aug. 7, 1945.   W. P. HUNSDORF   2,381,750
COIL WINDING APPARATUS
Filed Sept. 7, 1943    5 Sheets-Sheet 2
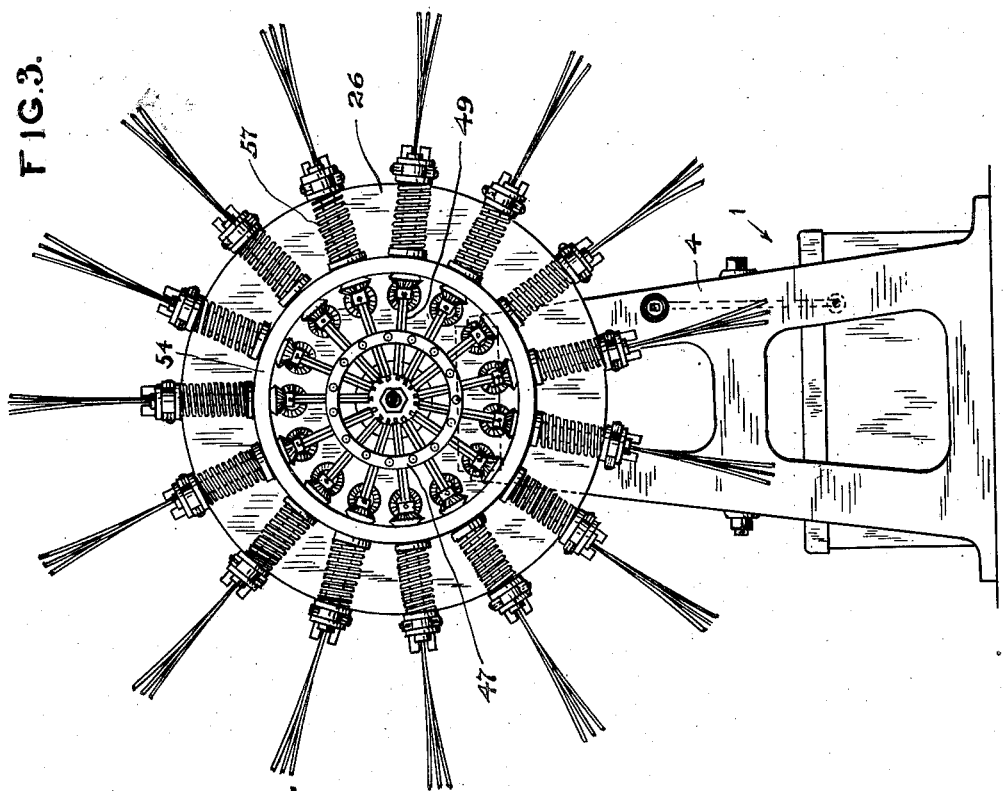
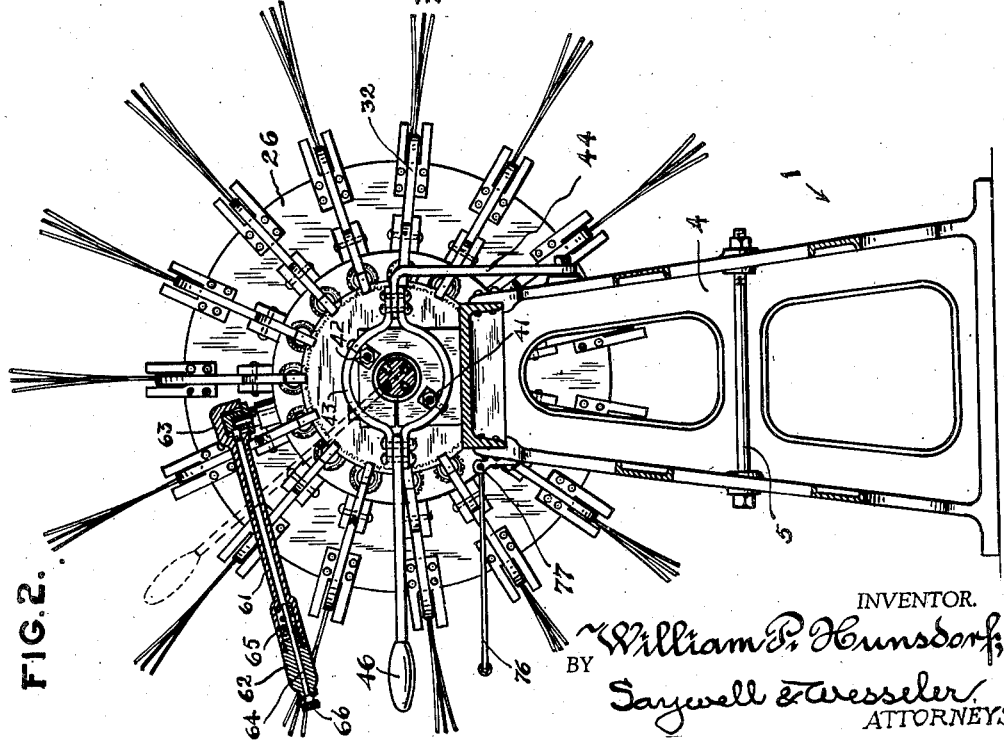
INVENTOR.
William P. Hunsdorf,
BY Saywell & Wesseler
ATTORNEYS.

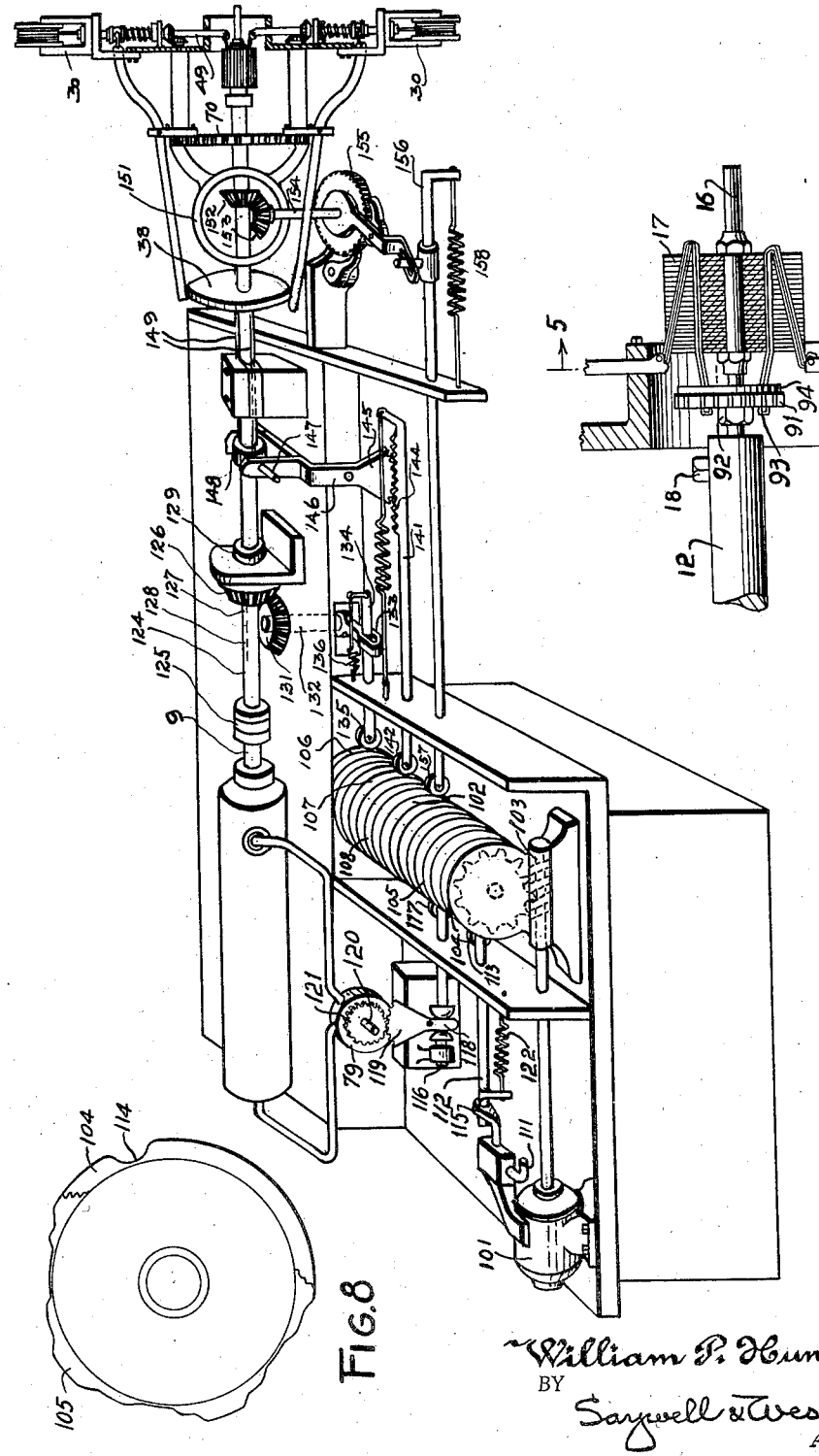

Aug. 7, 1945.  W. P. HUNSDORF  2,381,750
COIL WINDING APPARATUS
Filed Sept. 7, 1943   5 Sheets-Sheet 4

INVENTOR.
William P. Hunsdorf,
BY
Saywell & Wesseler,
ATTORNEYS.

Aug. 7, 1945.        W. P. HUNSDORF        2,381,750
COIL WINDING APPARATUS
Filed Sept. 7, 1943        5 Sheets-Sheet 5

INVENTOR.
William P. Hunsdorf,
BY Saywell & Wesseler,
ATTORNEYS.

Patented Aug. 7, 1945

2,381,750

UNITED STATES PATENT OFFICE 2,381,750

COIL WINDING APPARATUS

William P. Hunsdorf, Cleveland, Ohio, assignor to William P. Hunsdorf and Clarence E. Edson, joint trustees Application September 7, 1943, Serial No. 501,494

18 Claims. (Cl. 242—13)

This invention, as indicated, relates to an apparatus for winding coils for armatures and fields of electric apparatus. More particularly, it comprises a mechanism for multiple coil winding reducing time of production, and also resulting in a structure more resistant to destructive force and more symmetrical in form than conventional types of apparatus. It also comprises apparatus for winding armatures and fields for electrical apparatus which by simultaneously winding a plurality of coils under predetermined paths of winding movement with controlled tensioning and seating operations not only reduces the time of production, but also results in a product of symmetrical construction and of long service life.

The principal object of the present invention is to provide an apparatus for winding coils for armatures and fields of electrical devices which improves the product and reduces the time and cost of production.

Another object of the invention is to provide an apparatus adapted to handle multiple wires or series of wires simultaneously and place the same with precision and uniform tension upon the supporting members of electrical apparatus to better advantage than with methods of production or apparatus now in use.

Another object of the invention is to provide an apparatus to distribute wires under controlled tension on units of electrical apparatus whereby a number of windings will be completed simultaneously.

Another object of the invention is to provide an apparatus for full automatic or semi-automatic operation which will complete the windings of armature or field coils of electrical motors, generators and the like, in a minimum period of time, and with a minimum waste of material, and with a high degree of firmness, and resistance to destructive force in the finished product.

Another object of the invention is to utilize hydraulic pressure to wind coils for electrical devices simultaneously over the full extent of the unit operated upon and to provide terminal connections facilitating the completion of the unit more rapidly than under proceedings heretofore used.

Another object of the invention is to provide an open basket-woven type of coil for electrical apparatus having self-ventilating characteristics and flatter end terminal areas than conventional coils of this character.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain structures embodying the invention, such disclosed means constituting, however, but several of various forms in which the principle of the invention may be used.

In said annexed drawings:

Figure 1 is a side elevation, partly in section, showing an apparatus embodying the principles of the invention;

Figure 2 is a transverse sectional view taken along the line 2—2 shown in Figure 1 looking in the direction of the arrows;

Figure 3 is an end elevation of the structure shown in Figure 1 as seen from the right-hand side;

Figure 4 is a fragmentary view, partly in section, of the armature and its associated mechanism at the opposite end of its longitudinal movement from the position shown in Figure 1 and after the completion of a single turn;

Figure 5 is an enlarged diagrammatic view taken along the line 5—5 shown in Figure 4 looking in the direction of the arrows;

Figure 7 is a diagrammatic view in perspective of the apparatus shown in Figure 6 illustrating the operative control arrangements for each movement of the apparatus;

Figure 8 is a diagrammatic showing of the end portion of the cam drum with the arrangement of cam actuating elements thereon.

Figure 6:
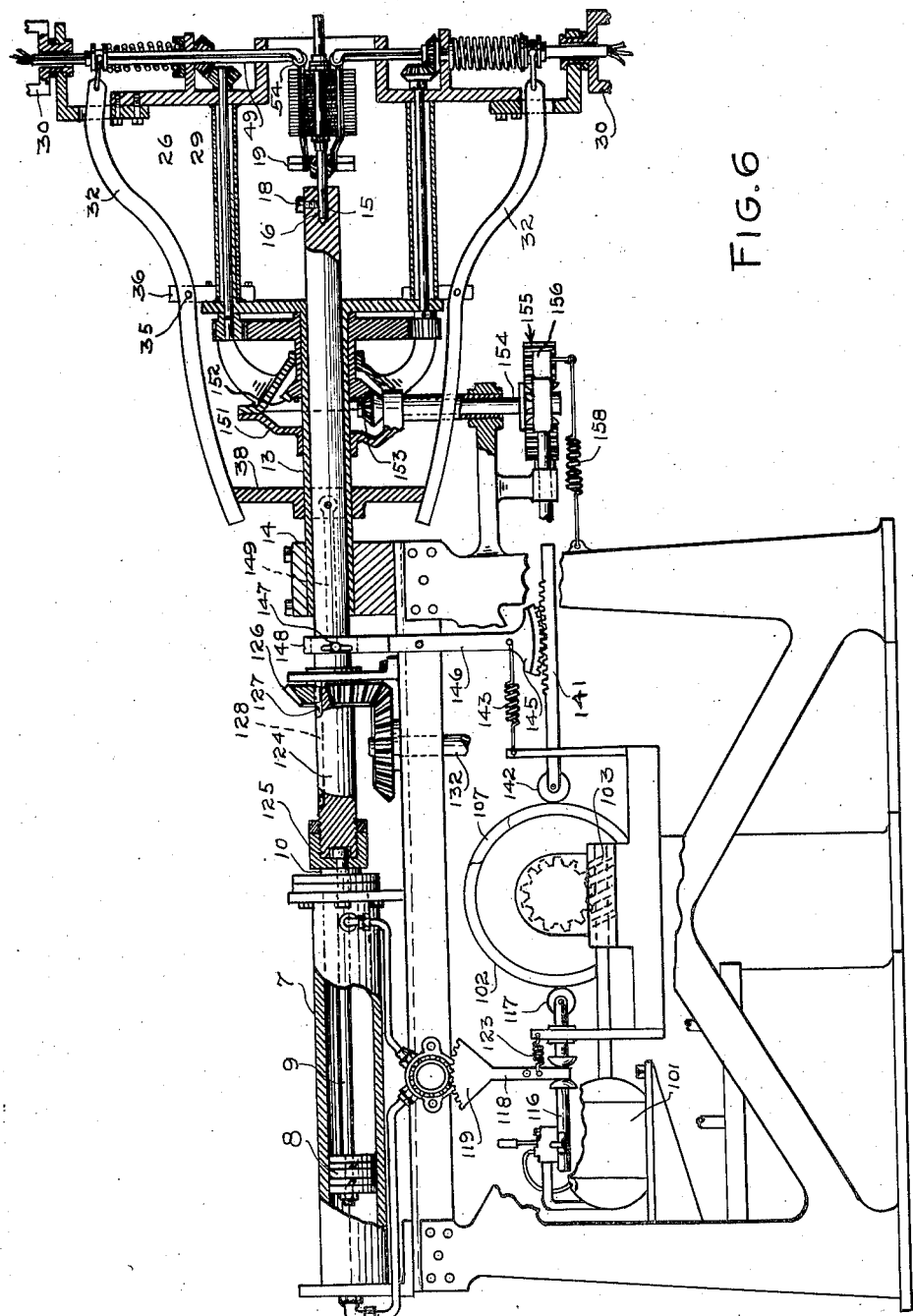
Figure 6 is a side elevation, partly in section, of an apparatus generally similar to the apparatus shown in Figure 1, but including means for automatically operating the same.

The invention, as has been indicated, may be embodied in apparatus of different types, and the process of constructing multiple wound units may be varied in accordance with the uses for which the units are intended. In the construction as shown in Figures 1 to 5, inclusive, the operation is carried out manually, but in view of the apparatus winding all of the wires simultaneously a high rate of production is effected, and a skillful operator can work with a high degree of precision and turn out a product of symmetrical appearance and unusual adaptability for heavy duty service. The apparatus as illustrated is supported on a frame 1 having standards 2, cross braces 3 and end frame members 4. Cross bars 5 may be provided at an intermediate position as strengthening elements. The top member 6 of the frame provides a support for a hydraulic cylinder 7 horizontally positioned at one end of the frame having a piston 8 of conventional construction operating a piston rod 9 projecting through a packing gland 10 at the forward end of the cylinder, and having a flexible connection 11 with an operating shaft 12 slidably engaged within a sleeve 13 firmly engaged within a split clamping block 14 at the end of the frame opposite the position of the hydraulic cylinder. The operating shaft has at its forward end an axial recess 15 within which the shaft 16 of an armature 17 may be firmly held by suitable means, such as a set-screw 18. The armature is preferably provided with a temporary commutator 19 to which the ends of the coils of wire are firmly secured. The shaft 12 is provided with a plurality of radial recesses 21, 22, at a point adjacent the flexible connection 11 heretofore referred to, and a hand bar 23 may be inserted in such recesses to give to the shaft any desired degree of rotational movement in the course of the winding operation. The sleeve 13 is provided at its forward end with a circular plate or disc 24 integrally secured thereto, said disc being provided with a series of openings adjacent its periphery corresponding to the number of feeding units to be incorporated in the apparatus. A series of tubular supports 25 is connected to the circular disc 24 at the respective rearward ends and to an annular plate 26 at the respective forward ends. The plate 26 has a series of holes in alignment with the holes formed in the disc 24, and operating shafts 27 are mounted in each of said tubular supports 25, each shaft carrying at its inner end a spur gear and at its forward end a beveled gear 29. Swiveled reels 30 are carried on the plate 26, and the free rotation of these reels prevents the interval twisting of the wire.

The plate 26 is provided around its periphery with a series of slotted brackets 31 each adapted to receive a guide and rocker arm 32 carrying at its forward end a fork 33 operatively engaged with a grooved head 34 on a wire feeding mechanism presently to be described. The rocker bars 32 are supported on pivots 35 mounted in slotted brackets 36 secured to the discs 24 adjacent each tubular member 25.

The inner free ends 37 of the rocker arms have their inclined end surfaces resting upon a movable disc 38 having a central hub 39 slidingly engaged on the sleeve 13.

The disc 38 is adapted to be actuated by means of a pair of slide rods 41, 42, slidably engaged through suitable apertures in the clamping block 14, as is also shown in Figure 2. The slide bars 41, 42, are connected at their forward ends to a circular enlargement 43 provided at an intermediate position of a shifting lever 44 mounted on a pivot 45 secured to an adjacent cross brace and having at its free end a hand grip 46. It will be readily understood that by shifting the lever just described in a rearward direction the rocker arms will tend to move the wire feeding units toward the axis of the shaft and shifting them reversely will retract the rocker arms radially away from the center line of such shaft. This action controls the position of the radial feeding members hereinafter to be described in relation to the respective slots of the armature or other electrical unit on which the wire coils are to be formed.

The construction of the radial wire feeding units will be described preliminary to describing the operative means for swiveling the same. The plate 26 heretofore described is provided with a large central hub 47 having openings 48 at suitable intervals to receive the tubular feeding bars 49. Each of the tubular feeding bars is provided with a longitudinal groove 50 which grooving is engaged by the projecting end of a stud 51 seated in the collar 52 of a beveled gear 53. Each beveled gear rests against the inner face of an annular supporting member 54 firmly secured at an intermediate position to the forward face of the plate 26. The beveled gears also are preferably engaged with the beveled gears 29 heretofore described. The annular member 54 has openings 55 in registry with the openings 48 in the hub heretofore referred to.

On the upper side of the opening 55 shallow cup members 56 are provided to serve as seats for expansion coil springs 57, the upper ends of which bear against a cup member 58 bearing against the grooved head member 34 heretofore referred to.

As has been stated the beveled gears 29 and 53 rotate the tubular feeding bars 49 to hold the wires smoothly in the slots of the armature. The wires are guided from a narrow feeding wheel 59 pivotally mounted at the end of the tubular member 49. As shown in Figure 1 of the drawings, three wires 60 are just laid in the slot of the armature, and the armature 17 is ready to be turned transversely as the tubular members are swiveled to carry the wires into the predetermined slot on the return longitudinal movement. The swiveling action of the radially positioned tubular members 49 is applied to the mechanism through a tubular lever 61 having a handle 62. At the end opposite the handle an adjusting head 63 is provided, operated by a rod 64 within the handle held in engagement by means of a spring 65 and controlled by means of a knob 66 at the end of the handle. The lever mechanism operates a pinion shaft 67 supported in a bracket 68 on an annular frame member 69 secured to the disc 24 heretofore described. The movement is intermittent, but always in the same direction.

The annular frame member 69 provides a housing for a central gear 70 engaging each of the spur gears 28 heretofore described, which, through the shafts 27 and beveled gears 29, cause a swiveling action of the tubular members 49 of the wire feeding mechanism. The hub 71 of the gear 70 carries at its opposite end a large beveled gear 72 which is engaged by a beveled pinion 73 on the pinion shaft 67. The gears referred to are enclosed in a detachable portion 74 of the frame member 69, being secured by a plurality of fastening elements 75.

As has been indicated, the lever 23 controls the rotational movement of the shaft 12 and the armature supported thereon, and the lever 61 controls the swiveling of the tubular wire feeding members 49. The reciprocating motion of the apparatus is controlled by means of a lever 76 having a connecting rod 77 connected to a rotatable valve member 78 in a valve casing 79 mounted adjacent the hydraulic cylinder 7 heretofore referred to.

The rotatable valve member 78 is adapted to be turned to neutral position or to be turned to a position causing hydraulic pressure to enter the rearward end of the cylinder 7 through a pipe 80, receiving the fluid through a pipe 81 from an accumulator 82 supported on an extension 83 of the supporting frame of the apparatus. The accumulator receives pressure through a supply line 84. When the valve is turned in reverse direction hydraulic pressure is received through the pipe 85 and enters the forward end of the hydraulic cylinder 7 through the pipe 86.

With the apparatus embodying the features above described the operator may proceed with the winding of an armature 17 in the manner shown in Figures 4 and 5 of the drawings. The armature shaft 16 is engaged in the main shaft 12, being held by the set-screw 18. A temporary commutator 91 is secured by a set-screw 92 to the armature shaft, and the ends of the wires 93 to be wound on the armature are firmly clamped in the temporary commutator. The temporary commutator may have a single clamping means in the form of a slotted disc 94, which, when turned across the main slotted disc of the commutator and firmly bolted thereto, will secure all of the wires in firm engagement.

With the parts connected as above mentioned movement of the main shaft rearwardly through the admission of fluid pressure to the forward end of the hydraulic cylinder 7 lays the position of each wire of the series in a slot of the armature in the manner shown in Figure 1. After the mechanism reaches the position shown in Figure 1 the main shaft with its armature is turned in a clockwise direction, each set of wires of the series being moved in the instance shown, two spaces distant from the slot originally filled, the swiveled feeding member 49 being turned appropriately by the lever 61 and the hydraulic pressure being admitted to the lower end of the cylinder to move the shaft 12 with its armature in a forward direction, the previously filled slot in each instance filled with the return portion of the coil, and the mechanism assumes the position shown in Figures 4 and 5. To form an entire turn of the coil the lever 23 is then used to turn the shaft 12 and the armature 17 in a clockwise direction, as shown in Figure 5, which causes each of the sets of wires of the series to be brought in alignment with the slot spaced therefrom a distance of two slots in the instance shown.

Thus in Figure 5 the wires held in slot 95 are carried past slot 96 and are about to enter slot 97 which already has been filled by a set of wires 98 placed therein by a tubular feeding member two spaces removed from the tubular member 49 shown in Figure 5. In the particular instance shown three wires 60 are fed at one time, the wires closely filling the tubular passageway within the member 49 and the lower wire riding upon the grooved feeding wheel 59, which, as stated, is angularly mounted at the lower end of its respective tubular member 49 and is turned to transverse position by means of the mechanism operated by the lever 61. When the wires reach the position shown in Figure 5 the lever 61 turns the wire feeding means to cause the grooved feeding wheel 59 to enter the slot 97 placing the three wires therein over the three wires originally placed therein by the feeding member, two spaces removed from the feeding member shown in Figure 5. The valve mechanism 78 is then shifted to admit hydraulic pressure to the forward end of the hydraulic cylinder 7 whereupon the armature will be longitudinally moved from the position shown in Figures 4 and 5 of the drawings to the position shown in Figure 1, there being, however, an additional layer of wires within each of the slots of the armature 17 over the original layer of wires shown in Figure 1. The closed path of movement just described is repeated until the required number of turns of wire are held in the respective slots. The ends of the respective coils are then released from the respective feeding members and temporary commutator slots and secured to the permanent commutator or other selected terminal unit.

While the transverse rotation of the commutator has been shown and described as winding the coil of two slot width it is to be understood that the coil may be of six slot width, or any other desired width, in accordance with the requirements of the particular unit of electrical equipment to be wound. As has been stated, the apparatus is adapted for the winding of armatures of different types as well as field units of different types, and any means may be utilized for moving such unit with reference to the wire feeding means or moving the wire feeding means relatively to such unit. The action may be carried on automatically as will be hereinafter described, and in place of hydraulic means different types of mechanical means may be substituted, or other fluid pressure means utilized.

The apparatus above described may be constructed for automatic operation, and besides functioning with a single head may have a plurality of alined armatures of identical character upon which windings may be placed simultaneously from their respective series of wire supply units identical with such unit above described, and operated by extension mechanism and controls for moving the wire feeding units radially and turning the tubular feeds, as well as indexing the armature cores as above described.

One form of automatic apparatus is shown in Figure 7 wherein most of the structural parts are identical with those above described for manual operation, and which have been identified by the same reference characters. The principal operative units for automatic operation comprise an electric motor 101 driving a cam drum 102, preferably through a worm and worm wheel reduction drive 103. The cam drum is provided with a plurality of cam tracks, in the present disclosure comprising cam units for motor switch cut-off 104, hydraulic cylinder control 105, main shaft rotation 106, radial movement of the tubular wire feeding units 107, and turning movement of the wire feeding units 108. All of these controls are shown as operating mechanically, but in place of cams the drum could be supplied with electrical contacts controlling solenoids or motors or valves of fluid pressure units. However, for ordinary use mechanical levers and suitable gear ratios provide adequate range of control and the shape and number of the actuating cams can bring about combinations of movement of the mechanism of great precision and producing work of exceptional quality at a high rate of output.

The motor is started by a button or switch lever 111, and the current is thereafter controlled by the slide bar 112 having its terminal roller 113 riding on the cam track 104. When the roller rides into a depression 114 shown in Figure 8 the switch 115 is turned and the motor is cut off. Adjacent the slide bar 112 another slide bar 116 is positioned, its terminal roller 117 engaging the cam track 105. This slide bar is connected to a lever 118 having a toothed sector 119 engaging a toothed wheel 120 on the valve stem 121 of the valve 79. Only slight movement of the lever system is required to turn the valve to forward, reverse and neutral positions in accordance with the cam shapes and positions on the cam track 105, as indicated in Figure 8. These slide bars are on the left-hand side of the drum 102 and are held in contact with the cam tracks by springs 122 and 123.

It will be noted that the cylinder shaft 9 is connected with the main shaft 124 by means of a swiveling coupling 125 which permits rotation in either direction of the main shaft. This turning movement of the main shaft is controlled by the bevel-gear 126 having a key 127 engaging a keyway 128 longitudinally of the main shaft and of an extent to accommodate the full range of movement of the armature unit on the end of the main shaft. The gear 126 is supported on a bracket 129 secured to the frame, and adjacent thereto a bevel driving gear 131 of suitable ratio is provided for driving the gear 126. The driving gear is mounted on a vertical shaft 132 rotatably supported on the frame and has an extension arm 133 operatively connected with a slide bar 134 having a terminal roller 135 riding on the cam track 106 under pressure of the spring 136. The mechanism just described will rotate the main shaft any predetermined amount in a clockwise or counter-clockwise direction in accordance with the contour of the cam areas of the cam track 106 and will hold such adjustment for the period provided by the length of such areas. The cam contours 106 are similar to the cam contours 105 as shown in Figure 8.

The radial adjustment of the tubular wire feeding units 49 is controlled by a slide bar 141 having a roller 142 riding on the cam track 107 and held in pressure engagement therewith by a spring 143. The free end of the slide bar is provided with a rack 144 engaged by a toothed segment 145 on a rocker frame 146 having slots in which are received trunnions 147 on the sides of a collar 148 slidingly engaged on the main shaft. Connecting links 149 on the collar are secured to the disc 38 and move the same in any degree necessary for the proper radial positioning of the tubular wire feeding units 49. The turning movement of these units together with the supply reels as a group is necessary when more than one wire is used in each member, and this is accomplished through the gear unit 151 similar in its action to the manually operated gear unit heretofore described with its associated mechanism. The gear unit has a bevel-gear 152 connected by a tubular shaft with the large gear 70 and is driven by a bevel pinion 153 on a shaft 154 projecting below the head mechanism and having a ratchet mechanism 155 connected with a slide bar 156 having a terminal roller 157 riding on the cam track 108 under the pressure of the spring 158. Suitable cam contours on the cam track turn the tubular feeding units at the proper intervals in harmony with the position of the armature unit and the other operative movements provided by the various cam positions on the respective cam tracks.

The operation of the device will be evident from the above description, including briefly the pressing of the starting switch 111, the forward movement of the main shaft with its armature through the valve control 105, the rotation of the shaft to the return slot position through the mechanism 106 with the turning of the tubular feeds by the mechanism 108, then the return of the unit to its original position longitudinally by the mechanism 105 and rotationally in reverse by mechanism 106 with positioning of the tubular feeds by mechanism 108, and repetition of the cycle until the windings have been completed with accompanying radial adjustment of the tubular feeding units as the slots are progressively filled, by the mechanism 107, and the final motor cut off by the switch control 104. The wire reels may be positively turned by the tubular feeds.

In Figure 8 there is diagrammatically illustrated a portion of the cam ring 104 for actuating a cut-off movement of the switch when the terminal roller rides into the depression 114. The cam ring 104 is cut away in part to disclose the cam ring 105 which by means of the cam contour moves the valve to open, closed and reversed position, according to the predetermined timing of the apparatus.

Figure 9:
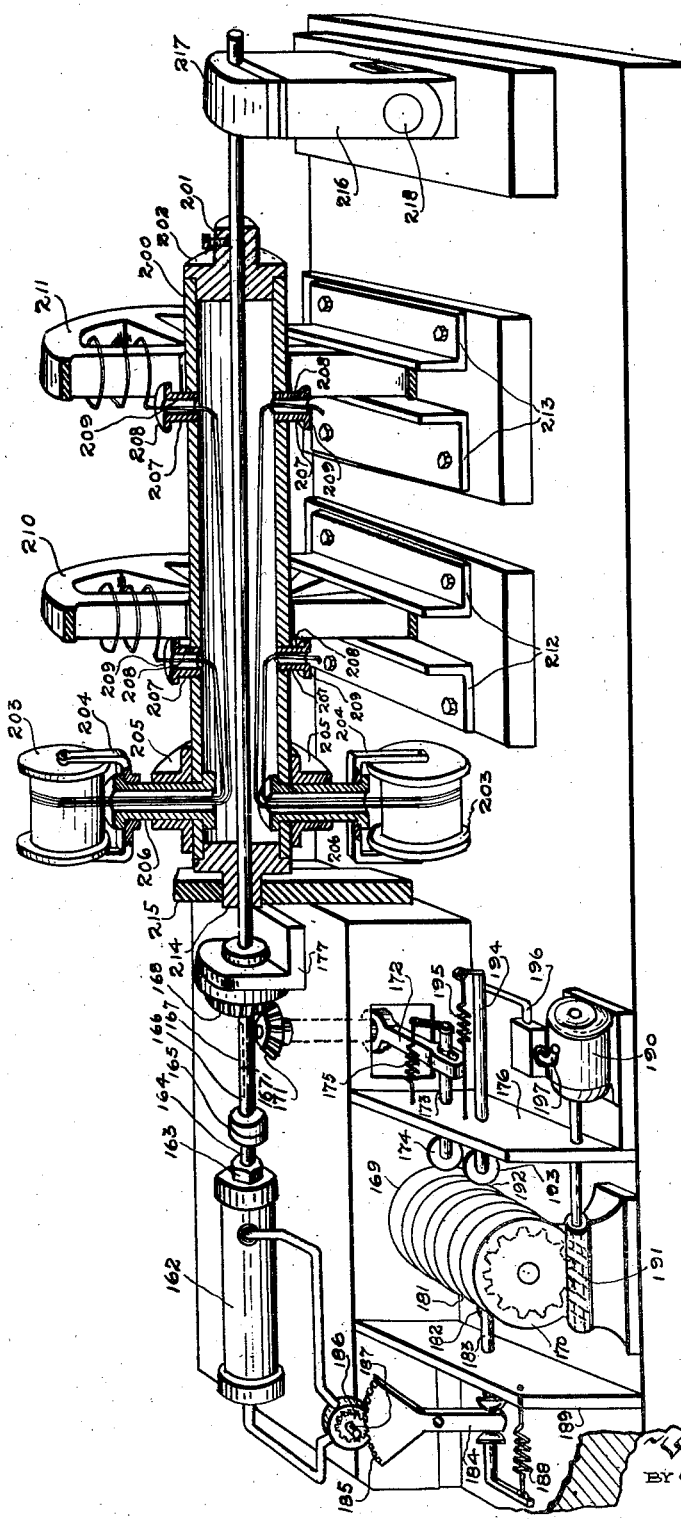
Figure 9 is a diagrammatic view in perspective of a semi-automatic apparatus for winding field coils.

The construction shown in Figure 9 of the drawings is designed for winding one or more alternating current field units under power and with semi-automatic control. It has the advantage over manual winding in that a number of coils are wound simultaneously at spaced points on the poles of one or more field units mounted on the apparatus. Hydraulic pressure is used to apply the wire firmly about the pole pieces and the automatic control may be set to stop the apparatus to permit the application of binding and positioning elements in accordance with the particular design of the coil under construction. The cam tracks may be arranged to turn a wire feeding mechanism through certain range for the winding in closely adjacent slots and to then change for winding in more widely separated slots in accordance with certain types of field units.

The apparatus shown in Figure 9 comprises a supporting frame 161 having a hydraulic cylinder 162 with a packing gland 163 and a piston rod 164 connected by means of a swivel joint 165 with a main shaft 166.

The main shaft is provided with a keyway 167 engaged by a key on the beveled gear 168 which when rotated turns the shaft through an angle and in a direction controlled by a cam track 169 on a cam drum 170. The beveled gear 168 is operated by the driving gear 171 having an extension arm 172 actuated by a slide-bar 173 having a terminal roller 174 held against the cam track 169 by means of a coil spring 175 connected with a support for the slide-bar 176. The gear 168 is mounted on a bracket 177 which permits the main shaft to be moved longitudinally by the action of the hydraulic cylinder 162. The control of the cylinder is carried out by means of a cam ring 181 against which a terminal roller 182 on the end of a slide-bar 183 engages, the slide-bar being associated with a lever arm 184 having a toothed segment 185 at its upper end engaging a toothed wheel 186 mounted on the valve shaft 187. A spring element 188 connected with the supporting member 189 serves to maintain the roller 182 in operative engagement with the cam track. Through a suitable positioning and shaping of the cam elements the valve position is turned as required for the combined movements of the parts. The cam drum 170 is driven by a motor 190 through a worm gear 191. Besides the cam tracks heretofore described a switch operating cam track 192 is provided against which a terminal roller 193 is engaged, the roller being on the end of a slide-bar 194. A spring 195 connected with the support member 176 serves to maintain the roller in engagement with its cam track 193. The slide-bar 194 is pivotally connected to the switch lever 196 and serves to turn the switch to inoperative position whenever the terminal roller 193 rides into a depression on the cam track. These depressions may be provided at points where the movement of the wire feeding mechanism is changed or enlarged, as the case may be. A switch button or hand lever 197 is provided to start the motor, after which the cam track will maintain the motor in operation until it is cut off as above described. The main shaft 166 serves as a support for the wire feeding mechanism which may assume various forms, but which is illustrated as comprising a tubular body member 200 having end upporting sleeves 201 firmly clamped upon the main shaft and having flanges 202 bolted to the ends of the body member.

Internally of the body member space is provided for the series of wires to be supplied to the pole pieces of the field coil units 210, 211 upon which coils are to be wound, such wires being carried on spools 203 swivelly mounted on tubular arms 204 through which the wire feeds. The tubular arms are mounted on a spider 205 firmly secured to the body member 200 suitably apertured to permit the passage of the wire. The wires are led from the respective spools through their respective feeding units 206 mounted on the body member at circumferentially spaced positions corresponding to the number of slots to be filled at one time by the apparatus in winding an alternating current field unit. The feeding unit comprises a pair of narrow standards 207, 208, which engage within the slot and project slightly above the inner margins thereof terminating at such points in a ring or shallow bowl 209 of greater width than the slot and forming a universal guide for the wire being fed irrespective of the direction of movement of the feeding mechanism. By reason of the narrow width of the supports 207, 208, they will enter the slots of the respective field units from either end which permits the wires to be laid through one slot after which the cam ring 169 causes the wire feeding mechanism to rotate to the selected slot for the return movement, whereupon the feeding unit will enter such slot carrying the wire thereinto through the action of the ring or shallow bowl 209, which action is repeated as the wire feeding unit emerges at the opposite end of the slot and is again alined for movement through the first mentioned slot in which the wire was laid. This cycle is repeated until the required number of turns are placed within the selected slots and thereafter the drum mechanism is in position to turn the feeding mechanism after each longitudinal passage of the wires into registry with a new pair of slots which likewise are filled, and the cycle is repeated for an additional winding of this character in accordance with the requirements of the field unit under construction. If the apparatus is to be under constant supervision the operator can adjust the wires to the proper position about the pole pieces at various times, and no additional parts to assist in placing the wires within the slots are necessary.

The field coil units 210, 211, are clamped to the frame by means of clamping fixtures 212, 213, respectively, adjacent their lower portions which hold them in concentric relation to the member 200.

A single field unit may be mounted on the apparatus, or a plurality of such units, in proportion to the capacity of the apparatus. When a single field coil unit is being wound the main shaft 166 may receive its principal support from a bearing member 214 at the upper end of a standard 215 forming part of the frame, and the use of a terminal supporting unit may be unnecessary. However, where two or more field coil units are to be wound by the same apparatus and standard 216 is provided at the extreme end of the frame, such standard having a pillow block 217 at its upper end to support the extreme end of the shaft. The standard is also provided with a central hinge 218 or equivalent connection whereby the upper portion of the standard may be moved out of its normal position to permit the ready engagement of the field coil units upon their supporting device concentrically of the wire feeding mechanism.

Where plural wires are to be fed to the field coil units a group of reels for each group of wires is mounted on a swivel platform on the top of each spider arm for each feeding unit 209. If desired, separate channels within the space between the body member 200 and the main shaft 166 may be provided whereby each wire, or set of wires, as the case may be, for each respective feeding unit 209 is held separate from similar wires for other feeding units. Under certain conditions, instead of the reels or spools of wire being held in horizontal position they may be mounted in a vertical position and the wire drawn from one end thereof. As stated, the spools may be positively driven if desired.

The mechanism for winding the field coil units, as well as the mechanism for winding the armature units, may be positioned vertically as well as horizontally where by reason of the special construction of the units to be wound requires that the friction upon the individual wires be reduced to a minimum along the feeding lines. It is to be understood that the customary insulation is applied to the surfaces of the poles of the armatures and field units, and that where required binding elements are added to the coils to maintain them in firmly secured position. However, the use of a hydraulic winding mechanism produces coils of unusual firmness, and in many instances no binding elements are required, or the number may be greatly reduced.

In hand winding operations on armatures and fields it is frequently a matter of some difficulty to identify the terminal portions of each coil. With the apparatus above described no such difficulty is experienced inasmuch as the wires may be readily identified from their position on the temporary commutator heretofore referred to at one end, and their position in their respective feeding units at the opposite end on each respective coil. This prevents any errors in securing wires to their respective commutator contact elements and greatly increases the rate of production.

Other modes of applying the principle of my invention may be employed instead of those explained, change being made as regards the structure and method herein disclosed, provided the means stated by any of the following claims or the equivalent of such stated means be employed.

I therefore particularly point out and distinctly claim as by invention:

1. An apparatus for winding coils on units of electrical apparatus comprising an armature core support adapted to be connected to one end of the shaft of a slotted armature core, a plurality of pivotally mounted wire feeding members having their discharge ends swivelling with the trailing wire fed therethrough in a direction substantially parallel to the slots of said core when moving lengthwise of said slots and adapted to be simultaneously positioned opposite each of said slots of said core respectively, means for causing relative movement of said feeds and core to lay loops of wire in selected pairs of said slots by successive movement longitudinally in one direction, then transversely at one end of said core to the companion slot, then reversely in said companion slot by longitudinal movement to the opposite end of said core, then transversely to the original slot of said pair, and thereafter in repetition of said cycle until the predetermined number of loops have been wound in each of said pairs of slots as a simultaneous operation.

2. An apparatus for winding coils on units of electrical apparatus comprising an armature core support adapted to be connected to one end of the shaft of a slotted armature core, a plurality of pivotally mounted wire feeding members having their discharge ends swivelling with the trailing wire fed therethrough in a direction substantially parallel to the slots of said core when positioned opposite each of said slots of said core respectively, means for causing relative movement of said feeds and core to lay loops of wire in selected pairs of said slots by successive movement longitudinally in one direction, then transversely at one end of said core to the companion slot, then reversely in said companion slot by longitudinal movement to the opposite end of said core, then transversely to the original slot of said pair, and automatic means for repeating said cycle until the predetermined number of loops have been wound in each of said pairs of slots as a simultaneous operation.

3. An apparatus for winding coils on units of electrical apparatus comprising an armature core support adapted to be connected to one end of the shaft of a slotted armature core, a plurality of pivotally mounted wire feeding members having their discharge ends swivelling with the trailing wire fed therethrough in a direction substantially parallel to the slots of said core when moving lengthwise of said slots and adapted to be simultaneously positioned opposite each of said slots of said core respectively, positively actuated means for causing relative movement of said feeds and core to lay loops of wire in selected pairs of said slots by successive movement longitudinally in one direction, then transversely at one end of said core to the companion slot, then reversely in said companion slot by longitudinal movement to the opposite end of said core, then transversely to the original slot of said pair, and thereafter in repetition of said cycle until the predetermined number of loops have been wound in each of said pairs of slots as a simultaneous operation.

4. An apparatus for winding coils on units of electrical apparatus comprising an armature core support adapted to be connected to one end of the shaft of a slotted armature core, a plurality of pivotally mounted wire feeding members having their discharge ends swivelling with the trailing wire fed therethrough in a direction substantially parallel to the slots of said core when moving lengthwise of said slots and adapted to be simultaneously positioned opposite each of said slots of said core respectively, positive means for moving said feeds radially and positive means for turning said feeds angularly comprising gears and associated mechanism operating successively in the same direction for causing relative movement of said feeds and core to lay loops of wire in selected pairs of said slots by successive movement longitudinally in one direction, then transversely at one end of said core to the companion slot, then reversely in said companion slot by longitudinal movement to the opposite end of said core, then transversely to the original slot of said pair, and thereafter in repetition of said cycle until the predetermined number of loops have been wound in each of said pairs of slots as a simultaneous operation.

5. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from a swivelly supported means, a slidable and rotatable support, said unit being carried by said support and centrally arranged with respect to the wire feeding members, and means for axially moving and oscillating said unit about its axis to lay wire from each feeding member along one slot, then crosswise to and back through another slot and then crosswise to the first named slot.

6. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swivelly supported means, a slidable and rotatable support, said unit being carried by said support and centrally arranged with respect to the wire feeding members, and means for establishing relative motion between said unit and said feding members to provide axial and oscillating motion between said unit and feeding members to lay at least one wire from each feeding member along one slot, then crosswise to and back through another slot and then crosswise to the first named slot.

7. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wires from a plurality of swivelly supported means, a slidable and rotatable support, said unit being carried by said support and centrally arranged with respect to the wire feeding members, and means for establishing relative motion between said unit and said feeding members to provide axial and oscillating motion between said unit and feeding members to lay a plurality of wires from each feeding member along one slot, then crosswise to and back through another slot and then crosswise to the first named slot.

8. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swivelly supported means, a slidable and rotatable support, said unit being carried by said support and centrally arranged with respect to the wire feeding members, and means for establishing relative motion between said unit and said feeding members to provide axial and oscillating motion between said unit and feeding members and intermittent positive rotation of said feeding members to lay at least one wire from each feeding member along one slot, then crosswise to and back through another slot and then crosswise to the first named slot.

9. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swively supported means, a slidable and rotatable support, said unit being carried by said support and centrally arranged with respect to the wire feeding members, and means for establishing relative motion between said unit and said feeding members to provide axial and oscillating motion between said unit and feeding members and intermittent positive rotation of said feeding members in a single direction of motion to lay at least one wire from each feeding member along one slot, then crosswise to and back through another slot and then crosswise to the first named slot.

10. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wires from a plurality of swively supported means, a slidable and rotatable support, said unit being carried by said support and centrally arranged with respect to the wire feeding members, and means for establishing relative motion between said unit and said feeding members to provide axial and oscillating motion between said unit and feeding members and intermittent positive rotation of each individual feeding member to lay a plurality of wires from each feeding member along one slot, then crosswise to and back through another slot and then crosswise to the first named slot.

11. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swively supported means, means for moving said feeding members away from said center, and means for moving said feeding members toward said center, a slidable and rotatable support, said unit being carried by said support and centrally arranged with respect to the wire feeding members, and means for establishing relative motion between said unit and said feeding members to provide axial and oscillating motion between said unit and feeding members to lay at least one wire from each feeding member along one slot, then crosswise to and back through another slot and then crosswise to the first named slot.

12. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swively supported means, means for moving said feeding members away from said center, and means for moving said feeding members toward said center, a slidable and rotatable support, said unit being carried by said support and centrally arranged with respect to the wire feeding members, and means for establishing relative motion between said unit and said feeding members to provide axial and oscillating motion between said unit and feeding members and intermittent positive rotation of each individual feeding member to lay at least one wire from each feeding member along one slot, then crosswise to and back through another slot and then crosswise to the first named slot.

13. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swively supported means, resilient means for moving said feeding members away from said center, and positive means for moving said feeding members toward said center, a slidable and rotatable support, said unit being carried by said support and centrally arranged with respect to the wire feeding members, and means for establishing relative motion between said unit and said feeding members to provide axial and oscillating motion between said unit and feeding members to lay at least one wire from each feeding member along one slot, then crosswise to and back through another slot and then crosswise to the first named slot.

14. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swively supported means, means for moving said feeding members away from said center, and means for moving said feeding members toward said center, a slidable and rotatable support, said unit being carried by said support and centrally arranged with respect to the wire feeding members, a continuously driven cam, and means operated thereby for moving said unit and said feeding members relatively to one another to lay the wire from each feeding member under tension in the form of a symmetrical loop around a pair of said slots.

15. An apparatus for winding a complete annular series of coils on electrical units, comprising means swively carrying a plurality of spools radially arranged about a common center, each of said units being on an axis passing through said center and having slots extending longitudinally thereof, means for feeding wire from each of said spools to said slots and means for causing relative movements axially and transversely between the feeding means and the units to form a loop of wire in each unit, part of which passes into a pair of slots and part around the end portions of the unit that lie between the ends of the said pair of slots.

16. An apparatus for winding a complete annular series of coils on an electrical unit, comprising means swively carrying a plurality of spools radially arranged about a common center, said unit being on an axis passing through said center and having slots extending longitudinally thereof, means for feeding wire from each of said spools to said slots, and means, including hydraulically actuated means, for causing relative movements axially and transversely between the feeding means and the unit to form a loop of wire in said unit, part of which passes into a pair of slots and part around the end portions of the unit that lie between the ends of the said pair of slots.

17. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swivelly supported means, means for moving said feeding members away from said center, and means for moving said feeding members toward said center, a slidable and rotatable support, said unit being carried by said support and centrally arranged with respect to the wire feeding members, a continuously driven cam, and means, including hydraulically actuated means, operated thereby for moving said unit and said feeding members relatively to one another to lay the wire from each feeding member under tension in the form of a symmetrical loop around a pair of said slots.

18. An apparatus for winding a complete annular series of coils on an electrical unit having a plurality of slots therein extending lengthwise of the periphery thereof, comprising a plurality of radially arranged rotatable feeding members mounted for radial movement toward a common center and each carrying wire from at least one swivelly supported means, means for moving said feeding members away from said center, and means for moving said feeding members toward said center, a slidable and rotatable support, said unit being carried by said support and centrally arranged with respect to the wire feeding members, a continuously driven cam drum, a series of cam tracks on said drum, and an individual train of mechanism associated with each cam track for moving said unit and said feeding members relatively to one another to lay at least one feeding wire from each feeding member under tension in the form of a symmetrical loop around a pair of said slots.

WILLIAM P. HUNSDORF.